United States Patent [19]

Martinson

[11] Patent Number: 4,961,074
[45] Date of Patent: Oct. 2, 1990

[54] MULTIBAND RADAR DETECTOR

[75] Inventor: Glen Martinson, Oakville, Canada

[73] Assignee: B.E.L-Tronics Limited, Mississauga, Canada

[21] Appl. No.: 242,540

[22] Filed: Sep. 12, 1988

[30] Foreign Application Priority Data

Dec. 23, 1987 [CA] Canada ................................. 555194

[51] Int. Cl.⁵ .......................... G01S 7/285; H04B 1/28
[52] U.S. Cl. ...................................... 342/20; 342/175; 455/168; 455/319; 455/325; 455/330
[58] Field of Search .................. 342/20, 175; 455/327, 455/328

[56] References Cited

U.S. PATENT DOCUMENTS

| | | | |
|---|---|---|---|
| 2,460,900 | 2/1949 | Newbold | 455/319 |
| 4,461,041 | 7/1984 | Dobrovolny | 455/328 |
| 4,553,266 | 11/1985 | Bates et al. | 455/328 X |
| 4,571,593 | 2/1986 | Martinson | 455/327 |
| 4,613,989 | 9/1986 | Fende et al. | 342/20 X |
| 4,630,054 | 12/1986 | Martinson | 342/20 |
| 4,691,379 | 9/1987 | Shizune | 455/319 |

OTHER PUBLICATIONS

Hilsop, "An 88–100 GHz Receiver Front End", Conf. 1979, IEEE Int. Microwave Symposium Digest, Orlando, Fla. 1979.

*Primary Examiner*—Gilberto Barrón, Jr.
*Attorney, Agent, or Firm*—Donald E. Hewson

[57] ABSTRACT

The invention concerns radar detectors which are capable of monitoring at least two frequency bands. A broad band antenna is provided, together with a mixer comprising an anti-parallel pair of diodes, and at least one local oscillator. The local oscillator frequency is mixed with radar frequency from the antenna to produce an intermediate signal which is amplified further down converted detected and fed to signal processing circuitry to actuate an alarm when radar frequency of interest is detected. The most effective mixing with the RF input takes place at twice the local oscillator frequency. By application of direct current bias to the mixer, the most effective mixing with the RF input is changed to occur at the local oscillator frequency. The local oscillator is used to monitor two different radar frequencies by application and non-application of DC bias to the mixer. For multiband detectors, more than one local oscillator may be used.

10 Claims, 5 Drawing Sheets

MULTIBAND RADAR DETECTOR

FIELD OF THE INVENTION

This invention relates to radar detection devices, particularly for the detection of microwave signals present in a variety of frequency bands used by police or intrusion radar devices.

BACKGROUND OF THE INVENTION

Radar detectors have been known for some considerable time. Police radar devices that are used in the detection and measuring the speed of moving vehicles, and also intrusion and zone security devices that are used on buildings, operate in various frequency bands, often depending on the country in which they are operating. For example, in North America it is common for police devices to operate in the X-band, at 10.525 gHz, and the K-band at 24.150 gHz. In Europe, however, police devices may operate in very different bands.

Moreover, because of the changes in the manner of use of police radar—e.g., in a pulsed manner or aimed crosswise to the traffic flow—it has become more necessary to provide radar detectors with increased sensitivity.

U.S Pat. No. 4,630,054 issued Dec. 16, 1986 to Martinson, disclosed a radar detection and signal processing circuit for frequencies in both the X- and K-bands, and which also provides for inhibited sensitivity in other bands. This is achieved, for example, by mixing the signals received by the detector with a local oscillator output of such a frequency which, when its first or second harmonic is mixed with an X-band or K-band signal respectively, the resultant produces a particular intermediate frequency signal. This intermediate frequency signal may be mixed with a signal from a swept frequency oscillator and thence through a band pass filter and other signal processing circuitry, to actuate the alarm.

Since signals other than from the X-band and the K-band will not mix with the local oscillator output to produce an intermediate signal of the required frequency, these other signals are effectively ignored by the device.

Unfortunately, it has not been possible to use this system effectively for more than two or possibly three frequency bands, since the strength of the intermediate signal diminishes with each higher harmonic of the local oscillator utilised. Moreover, even the signal strength for the K-band using the second harmonic of the local oscillator is diminished with respect to that for the X-band.

It is an aim of the present invention to provide a radar detector that can be used for a variety of frequency bands to provide a substantially uniform signal to actuate the alarm. It is envisaged that the number of frequency bands coverable will usually be more than two.

BRIEF DISCUSSION OF THE INVENTION

The present invention provides a multiband radar detector device comprising a broad band antenna such as a horn antenna; at least one local oscillator; a mixer having a radar frequency input port, a local oscillator frequency input port, and an intermediate signal output port; means to feed a signal from the antenna to the radar frequency input port, and a signal from said at least one local oscillator to local oscillator input port of the mixer; and means to feed an intermediate signal output from the intermediate signal output port to signal processing circuitry to actuate an alarm in response to detected radar; wherein the mixer comprises an anti-parallel pair of diodes, and bias supply means are provided to supply a direct current bias thereto.

When no DC bias is applied to the anti-parallel mixer diode pair, the most effective mixing takes place at twice the local oscillator frequency. When appropriate DC bias is applied, the most effective mixing takes place at the fundamental frequency of the local oscillator. Hence, a single local oscillator may be used to monitor two frequency bands without directly utilising harmonics of the fundamental frequency.

The invention also provides a multiband radar detector device as described having a plurality of local oscillators; means to feed a signal from the antenna to a mixer; and means to feed signals sequentially from the local oscillators to the mixer for mixing, each in its turn, with the signal from the antenna so as to produce the intermediate signal outputs.

The means to feed signals sequentially from the local oscillators to the mixer may comprise a feed line for signals to the mixer and electromagnetic coupling means between the local oscillators and the feed line. Although "electromagnetic coupling" is referred to and is, in fact, strictly accurate, the coupling means may comprise a dielectric resonator for each local oscillator; and hence the coupling may be seen to be largely magnetic. In this case, each dieletric resonator should be spaced a distance from, and positioned with respect to, the feed line to determine the electromagnetic coupling strength between each dieletric oscillator and the mixer. This distance may be the shortest distance, measured between a tangent to the dielectric resonator and the feed line, selected for each dielectric resonator such that the electromagnetic coupling strength between the dielectric resonator and the feed line is optimised for mixing between a signal from the antenna in a band of interest, and the signal from the respective local oscillator.

Additionally, for optimum coupling, each dielectric resonator may be positioned a distance, measured from the centre of the dielectric resonator to an end of the feed line, equal to an odd number of quarter wave lengths of the respective oscillator frequency.

The number of local oscillators should be chosen to accommodate the expected number of frequency bands to be monitored, and the fundamental frequency or second harmonic of each local oscillator is chosen to produce an IF of the correct frequency when a frequency in the desired RF input band is present. Normally, four local oscillators will be sufficient.

BRIEF DESCRIPTION OF THE DRAWINGS

An embodiment of the invention will now be described by way of illustration with reference to the drawings, in which.

DETAILED DESCRIPTION OF THE PREFERRED EMBODIMENTS

Figure 2:
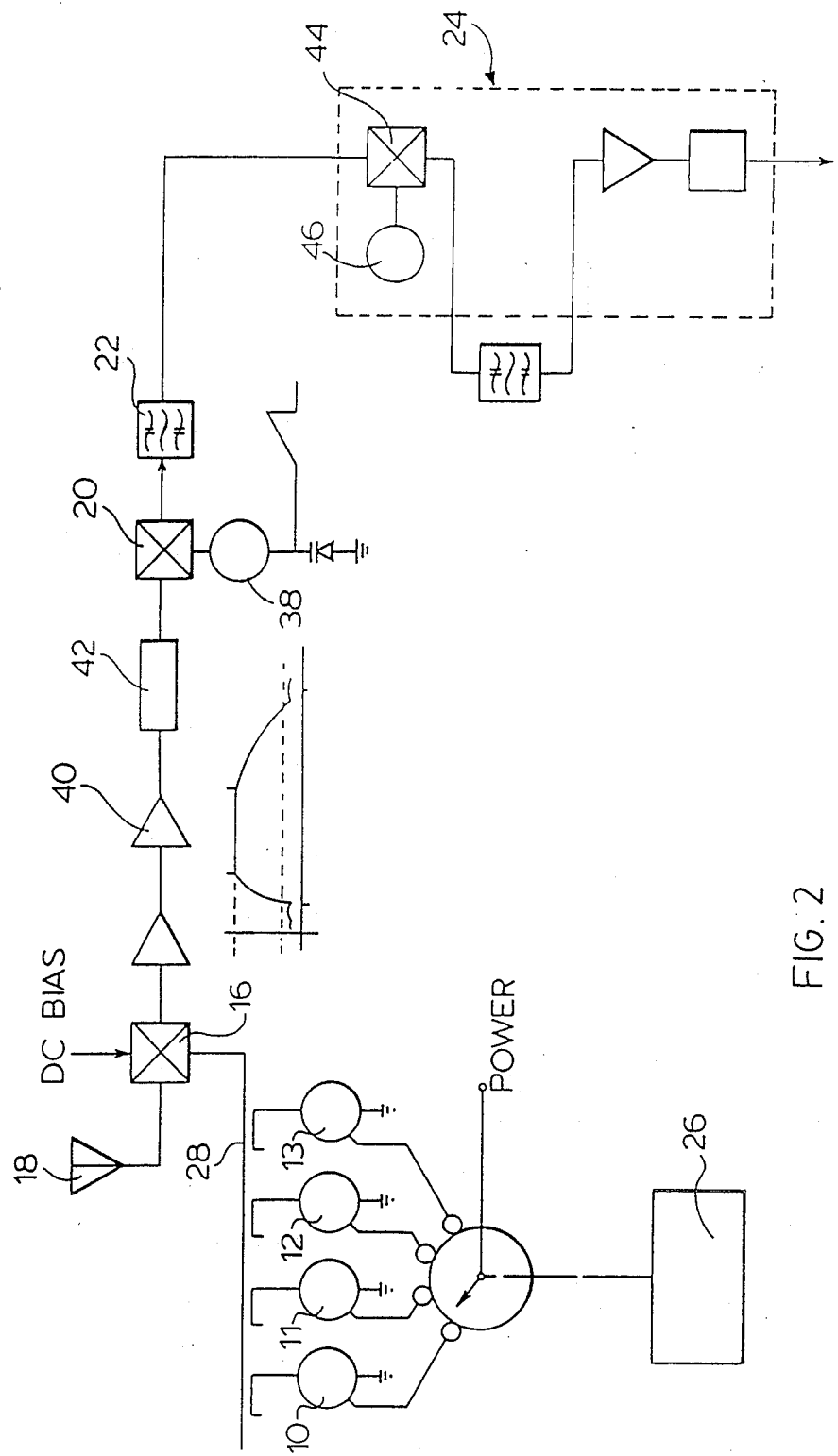
FIG. 2 is a block schematic, showing circuitry employed in the embodiment of FIG. 1.

FIG. 2 shows four local oscillators 10, 11, 12, and 13 connectable separately to a mixer 16 to feed signals thereto, an antenna 18 also feeding a signal to mixer 16, a second mixer 20, a bandpass filter 22, and further signal refining circuitry generally indicated at 24. The detected signal emerging from circuitry 24 may be further processed in a conventional manner to actuate a radar detection alarm.

Signal processing circuitry which may be used is described in U.S. Pat. No. 4,630,054 previously referred to. Similarly, other signal processing circuitry is possible, and the details of such circuitry will not be particularly described.

Figure 1:
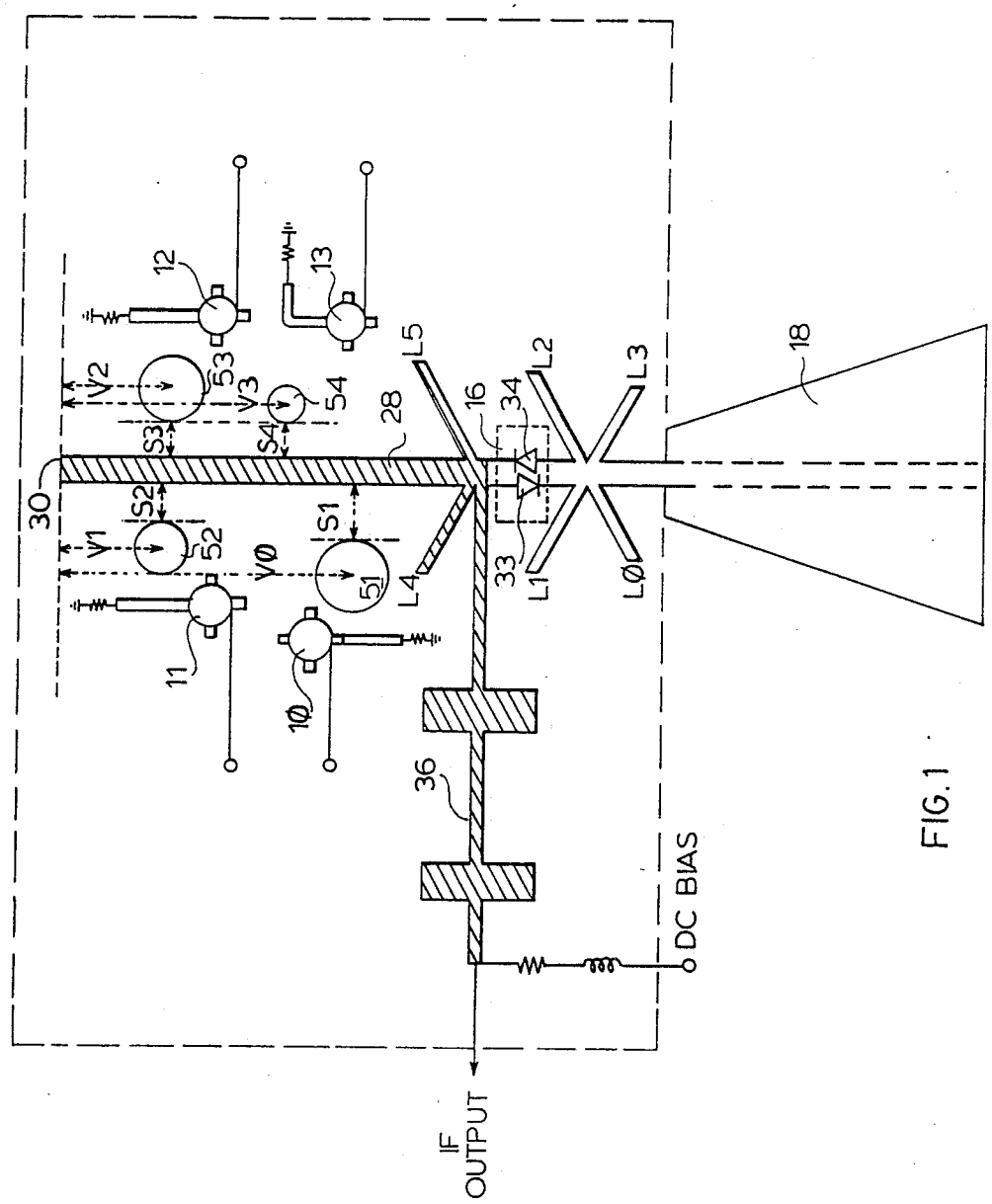
FIG. 1 is a microstrip circuit diagram showing the interrelationship of local oscillators and feed line in an embodiment of the invention.

Although four local oscillators 10, 11, 12, and 13 are shown in each of FIGS. 1 and 2, any suitable number of oscillators may be used to monitor the expected number of frequency bands. It is envisaged that, for a detector covering at least most of the desirable bands, the number of oscillators is likely to be four. The oscillators may be Gunn or transistor oscillators.

The antenna 18 is shown as a horn antenna but, in fact, the only limitation is that it should be capable of receiving radiation within the expected frequency bands which may be scanned sequentially in search.

During the period that the frequency bands are being scanned, the local oscillators 10, 11, 12 and 13 are selectively powered from microprocessor 26 so that only the local oscillator required for the band being scanned at any instant is powered. FIG. 1 shows dielectric resonators 51, 52, 53 and 54, by means of which the local oscillators 10, 11, 12, 13 are both stabilized and selectively electromagnetically coupled to a feedline 28 according to the oscillator which is powered. All the oscillators that are not powered at any instant are decoupled from the feedline by narrow band coupling afforded by their respective dielectric resonators which resonate at frequencies different from that of the respective active oscillator.

The resonators 51, 52, 53 and 54 are spaced a distance S1 S2, S3, and S4 respectively, from the feed line 28 to determine the electromagnetic coupling coefficient between each dieletric oscillator and the mixer. The distances S1, S2, S3, and S4 are measured between a tangent to the respective dielectric resonator and the edge of the feedline 28, and are selected for each dieletric resonator such that the electromagnetic coupling coefficient is optimised for best mixer performance on the respective band.

Open circuited high impedance stubs L0, L1, L2, and L3, corresponding in number to the number of local oscillators, are in quarter wavelength open circuits for the four local oscillator frequencies to provide for good local oscillator - radar frequency isolation. Further high impedance lines L4 and L5 are also provided, and adjustment of the length of these lines and of the length of the feedline 28 to a distance equal to an odd number of quarter wavelengths provides the required radar frequency match.

As shown in FIG. 1, the strip structure is very simple. This simple structure may only be used if the radar frequency and the local oscillator frequency are relatively far apart. When the radar frequency and the local oscillator frequency are closer together, more complex structures are necessary to ensure there is low impedance for the local oscillator frequency adjacent the mixer on the antenna side. In these cases band reject filters for the local oscillator frequencies can be placed along the microstrip line between the antenna input and the mixer diodes.

These filters are positioned along the microstrip line such that a short circuit for each local oscillator frequency is obtained at the RF input side of the mixer diodes. As the local oscillator and RF input frequencies are chosen not to coincide, the band stop filters centered on each local oscillator frequency will not affect transmission of RF signals from the antenna to the local oscillator input port. For optimum coupling, the dielectric resonators are positioned from the end 30 of the feedline 28 at distances V0, V1, V2 and V3 equal to an odd number of the respective frequency ¼ wavelengths, to provide short circuits for the resonators. These distances are measured from the centre of the respective dielectric resonator to a point level with the end 30 of the feedline.

Figure 3:
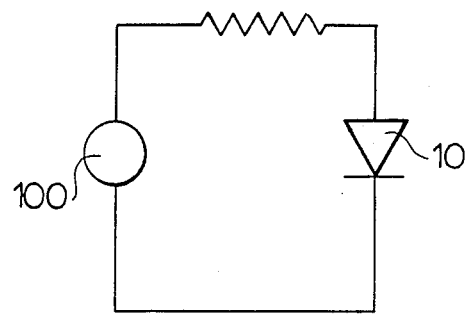
FIG. 3 is a diagram of a prior art circuit applying an oscillating drive signal to a diode.

The mixer 16 comprises an anti-parallel pair of diodes 33 and 34, to which direct current bias is applicable through a low pass filter 36. When an oscillator provides a drive signal for a single diode as in the prior art circuit shown in FIG. 3, the diode conducts whenever the oscillator signal overcomes the diode threshold.

Figure 4:
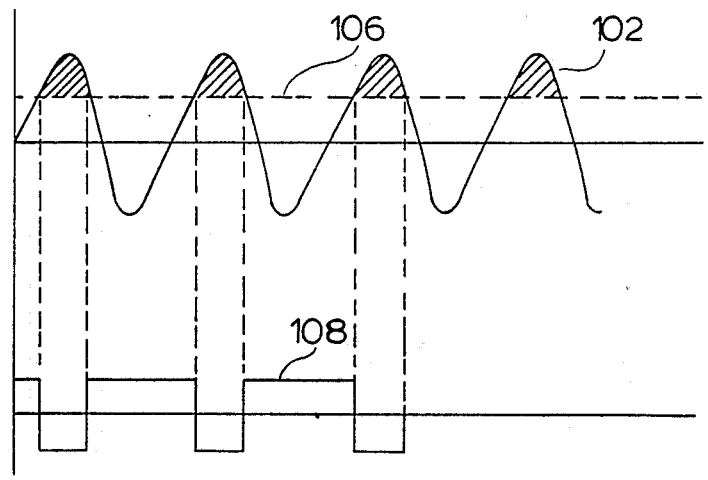
FIG. 4 shows the idealized reflection co-efficient waveform of the mixer diode from the circuit of FIG. 3.

Thus, an oscillator 100 may have a wave form 102 at a fundamental frequency fLo. The oscillator 100 may drive a diode 104 having a threshold 106. The diode 104 conducts when signal 102 is greater than threshold 106 to produce an idealised reflection co-efficient waveform 108 shown in the lower part of FIG. 4. It can be seen that the diode 104 conducts in the cross hatched portion of FIG. 4 and the fundamental frequency of the diode reflection co-efficient is the same as the fundamental frequency of the oscillator 100. Diminished amplitude of harmonics components yields high conversion loss at harmonic frequencies. Best mixing occurs at fLo.

Figure 5:
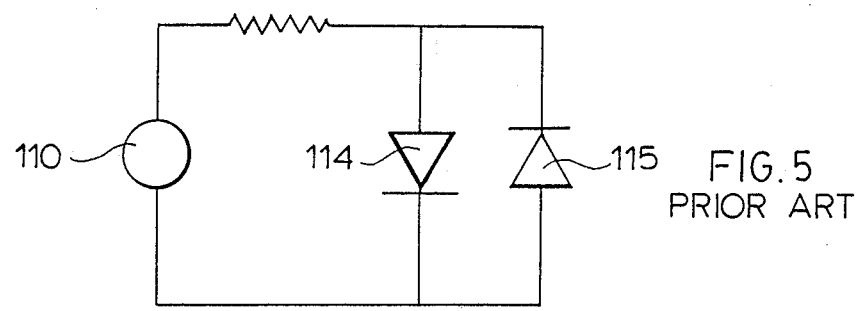
FIG. 5 is a diagram of a prior art circuit applying an oscillating drive signal to an anti-parallel diode pair.
Figure 6:
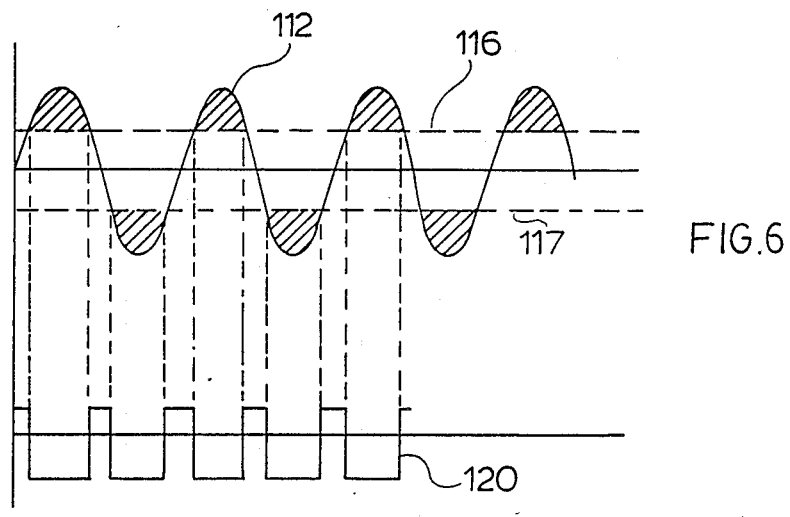
FIG. 6 shows the idealized reflection co-efficient waveform of the mixer diode for the circuit of FIG. 5.

When, as shown by FIGS. 5 and 6, an oscillator 110 drives an anti-parallel diode pair comprising diodes 114 and 115, each diode conducts when a signal 112 overcomes its respective threshold.

Thus, if oscillator 110 has a signal 112 at a fundamental frequency fLo, and diodes 114, 115 have thresholds 116, 117 respectively, then the diodes conduct in the cross hatched portions of FIG. 5 to provide an idealised reflection co-efficient wave form 120 as shown in the lower part of FIG. 6.

The diode reflection co-efficient fundamental frequency is twice the fundamental frequency of the oscillator, thus 2fLo, due to the fact that each of diodes 114, 115 conducts once in each cycle of oscillator 110. This now gives best mixing at 2fLo.

Figure 7:
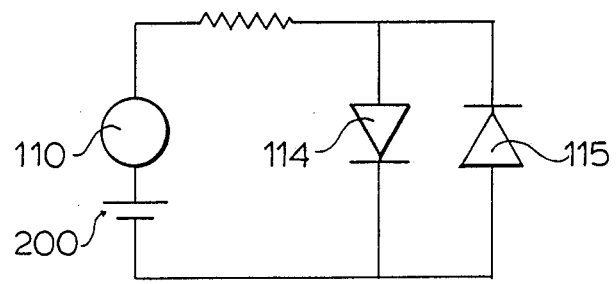
FIG. 7 shows a novel circuit for applying DC bias to an anti-parallel diode pair as shown in FIG. 5.
Figure 8:
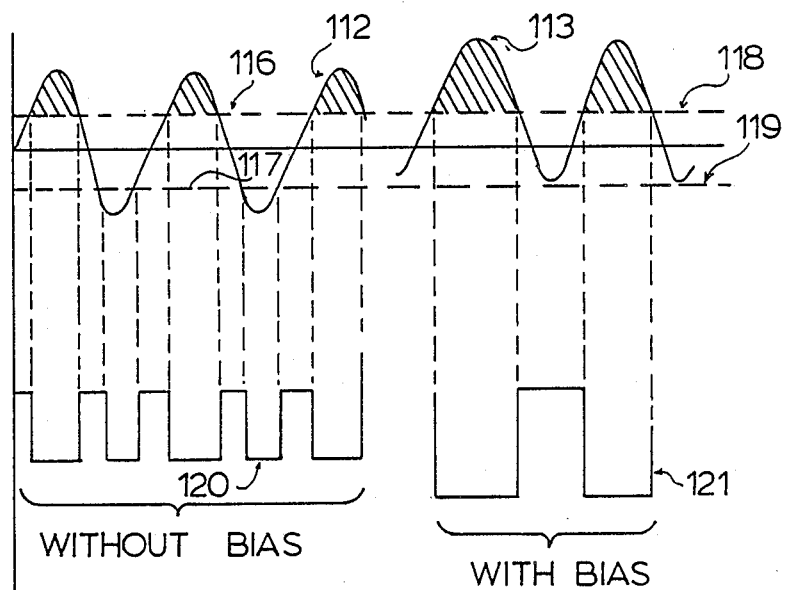
FIG. 8 shows the idealized reflection co-efficient waveform of the mixer diode for the circuit of FIG. 7; with and without the application of DC bias.

Now, in embodiments of the invention, DC bias 200 may be applied to such a circuit in which oscillator 110 drives an antiparallel diode pair 114, 115 in series with a DC voltage source 200, as shown in FIG. 7. In this case, application of DC bias effectively alters the wave form of the voltage applied to the diode as shown in FIG. 8, from that shown at 112 to that shown at 113. The idealised reflection co-efficient waveforms produced by the anti-parallel pair of diodes are, hence, also altered to that shown at 120 and that shown at 121 respectively. It can be seen that the fundamental frequency of waveform 120 is twice that of the fundamental frequency of the oscillator 110 as previously described with reference to FIGS. 5 and 6. Thus, application of a DC bias at or around the threshold value of the diodes 114, 115 results in a reflection co-efficient waveform 121 which has a fundamental frequency component the same as the fundamental frequency of the oscillator 100.

Figure 9:
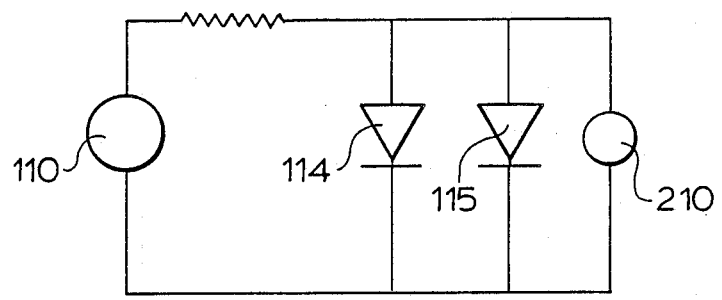
FIG. 9 shows an alternative, current source circuit for applying DC bias to an anti-parallel diode pair.

FIG. 9 shows an alternative arrangement by which current driven DC bias may be applied from current generator 210 to anti-parallel diode pair 114, 115. In this case the oscillator 110 is in parallel with the anti-parallel diode pair 114, 115. The current source 210 is calculated to produce the same or similar bias as that illustrated in FIG. 8.

Similarly, in the circuitry of FIG. 1, when no bias is applied to the anti-parallel diodes 33 and 34, the dominant mixing mode will be at twice the fundamental frequency of the respective local oscillator. By application of the DC bias to the diode pair 33 and 34, the mixer reflection coefficient varies at the fundamental frequency of the respective local oscillator for the dominant mixing mode. Thus, by using the mixer in a mode with no DC bias applied and in a mode in which DC bias is applied for each local oscillator, each local oscillator may be caused to serve two radar frequency bands, without the necessity to rely on the second harmonic of the mixer reflection co-efficient waveform to provide mixer product. The DC bias is applied or removed through control from the microprocessor 26. To cause the fundamental frequency of the mixer diode reflection co-efficient to vary at either fLo or 2 fLo.

For example, an unbiased GaAs diode pair 33, 34 can provide 8 db conversion loss in the K-band (24.150 gHz) using the normal dominant twice the local oscillator frequency mode. The mixer product at the fundamental local oscillator frequency is 50 db below the level achieved with the biased mixer. A biased mixer in normal dominant mode is capable of 6 db conversion loss in the X-band (10.525 gHz). Thus, it can be seen that a single local oscillator can serve two frequency bands by appropriate selection of the first intermediate frequency, and by switching the bias of mixer 22. This provides less conversion loss than applying the local oscillator frequency to the mixer diode and extraction of the IF response due to the 2fLo component of a mixer reflection co-efficient waveform of fundamental frequency fLo.

By way of further example, local oscillator 10 may be selected to serve the K-band and the X-band. In this case, the twice fundamental local frequency (2fLo) mode would mix with a K-band (24.150 gHz) signal to yield the same first intermediate frequency (FIF) as the fundamental frequency mode (fLo) yields with the X-band (10.525 gHz).

$$24.150 - 2fLo = FIF$$

$$fLo - 10.525 = FIF$$

Therefore FIF = 1.033 gHz

To serve the X-band, local oscillator 10 would be activated and a bias would be applied to diodes 33, 34 of mixer 16. A second local oscillator 38 (see FIG. 2) would be swept over a range to cover the X-band in the range of interest. To serve the K-band, local oscillator 10 is activated and no bias is used. The second local oscillator 38 is swept over a range to cover the K-band.

Other pairs of bands can be surveyed by depowering oscillator 10 and powering one of the other oscillators 11, 12, or 13. The frequency of any one of oscillators 11, 12 and 13 is selected so that it will mix with a signal centered in the desired band to yield an intermediate frequency of 1.033 gHz. For example, three local oscillators may be used to monitor radar bands containing signals of 9.41 gHz, 24.150 gHz, 9.9 gHz, 13.45 gHz and 34.36 gHz. These signals are commonly used by police radar devices in Europe. In this case, the signals may be grouped into pairs such that in one group:

$$24.150 - 2fLo = FIF$$

$$fLo - 9.41 = FIF$$

Therefore FIF = 1.776 gHz and fLo (fundamental frequency for LO) = 11.1866 gHz.

For the next group:

$$13.45 - 2fLol = FIF$$

$$fLol - 9.9 = FIF$$

Therefore, for a FIF of 1.776 gHz established from the first group, the fLol (fundamental frequency for L1) can be calculated. In fact for an FIF of 1.775 gHz—which is close enough—fLol is 11.675 gHz. The appropriate local oscillator may be provided in accordance with this calculation.

For the remaining frequency:

$$34.36 - 2fLo2 = FIF = 1.775 \ gHz$$

Therefore fLo2 (fundamental frequency of L2) = 16.292 gHz. The appropriate local oscillator is provided.

A system to tune bands centered at 10.525 gHZ, 24.150 gHz, 34.36 gHz and 9.9. gHz could be achieved using 3 dielectrically stablized oscillators. This could be realized as follows:

| | |
|---|---|
| OSC 1 = 11.558 gHz<br>Bias, dominant mix at fLo | 11.558 − 10.525 = 1.033 gHz |
| OSC 1 = 11.558 gHz<br>No Bias, dominant mix at 2 fLo | 24.150 − 2(11.558) = 1.033 gHz |
| OSC 2 = 16.663 gHz<br>No Bias, dominant mix at 2 fLo | 34.36 − 2(16.663) = 1.034 gHz |
| OSC 3 = 10.933 gHz<br>Bias, dominant mix at fLo | 10.993 − 9.9 = 1.033 gHz |

The first intermediate frequency output signal from mixer 16 is passed through amplifier 40 and image filter 42. It then passes to the second mixer 20 where it is further down-converted by mixing with signal from the second local oscillator 38. Thus, if the first intermediate signal has a band width of 200 MHz centered at 1.033 gHz, the second intermediate frequency response should supply at least 15 db attenuation at 833 MHz to reduce image noise to acceptable levels. In addition, the frequency response at 1416 MHz and above should be down 15 db to prevent harmonics of the second local oscillator down converting to noise.

The second intermediate frequency signal is passed through the band pass filter 22 to a third mixer 44 in circuitry 24. In the third mixer 44 the second intermediate frequency is mixed with output from third oscillator 46 in a similar manner as has been described for operation in second mixer 20.

I claim:

1. A multiband radar detector device comprising:
   a broad band antenna;
   at least one dielectric resonator local oscillator having an output at a first predetermined frequency;
   a mixer having a radar signal input port, a local oscillator input port, and an intermediate frequency signal output port;
   means to feed a signal from the antenna to the radar signal input port;
   means to feed a signal from said at least one dielectric resonator local oscillator to the local oscillator signal input port of the mixer;
   and means to feed a resulting intermediate frequency signal from said intermediate frequency signal output port of said mixer to signal processing circuitry for actuating an alarm in response to detected radar;
   said multiband radar detector being adapted to respond to first and second radar frequency signals wherein the difference of a first radar frequency and the frequency of the dielectric resonator local oscillator is the intermediate frequency, or the difference of the second radar frequency and twice the frequency of the dielectric resonator local oscillator, is the intermediate frequency;
   wherein said mixer comprises an anti-parallel pair of diodes, and bias supply means are provided to supply a direct current bias thereto so as to turn on either one of said pair of diodes depending on the sense of the bias supply thereto;
   whereby the diode reflection co-efficient fundamental frequency may be the frequency of the dielectric resonator local oscillator or twice the frequency of the dielectric resonator local oscillator, depending on the presence or absence of said bias;
   so that said resulting intermediate frequency signal is always a product of the fundamental frequency of the mixer diode reflection co-efficient for each of said first and second radar frequencies.

2. A multiband radar detector device comprising:
   a broad band antenna;
   a plurality of dielectric resonator local oscillators each having an output at a first predetermined frequency;
   a mixer having a radar signal input port, a local oscillator input port, and an intermediate frequency signal output port;
   means to feed signals sequentially from said dielectric resonator local oscillators directly to said local oscillator signal input port of said mixer for mixing, each in its turn, with the signal from said antenna;
   and means to feed an intermediate frequency signal from said intermediate frequency signal output port of said mixer to signal processing circuitry for actuating an alarm in response to detected radar;
   said multiband radar detector being adapted to respond to radar frequencies wherein the difference of a first radar frequency and the frequency of a selected dielectric resonator local oscillator is the intermediate frequency, or the difference of a second radar frequency and twice the frequency of the selected dielectric resonator oscillator is the intermediate frequency, a respective dielectric resonator local oscillator being selected for each band of interest of radar frequency signals;
   wherein said mixer comprises an anti-parallel pair of diodes, and bias supply means are provided to supply a direct current bias thereto so as to turn on either one of said pair of diodes depending on the sense of the bias supply thereto;
   whereby the diode reflection co-efficient fundamental frequency may be the frequency of the dielectric resonator local oscillator or twice the frequency of the dielectric resonator local oscillator, depending on the presence or absence of said bias;
   so that said resulting intermediate frequency signal is always a product of the fundamental frequency of the mixer diode reflection co-efficient for each of said first and second radar frequencies.

3. A multiband radar detector device as claimed in claim 1, in which the antenna is a horn antenna.

4. A multiband radar detector device as claimed in claim 2, in which the antenna is a horn antenna.

5. A multiband radar detector device as claimed in claim 4, wherein the means to feed signals sequentially from said dielectric resonator local oscillators to said local oscillator input port of said mixer comprises a feedline for signals from said dielectric resonator local oscillators together with means to effect electromagnetic coupling between said dielectric resonator local oscillators and said feedline.

6. A multiband radar detector device as claimed in claim 5, wherein the means for effecting electromagnetic coupling of said dielectric resonator local oscillators with said feedline is achieved by positioning each respective dielectric resonator a distance from, said feedline so as to effect electromagnetic coupling between each dielectric resonator and said mixer.

7. A multiband radar detector device as claimed in claim 5, wherein the shortest distance, measured between a tangent to each respective dielectric resonator and the feedline, is selected for each dielectric resonator such that the electromagnetic coupling coefficient between each respective dielectric resonator and said feedline is optimized for mixing a radar frequency signal within a band of interest with the local oscillator signal from a respective dielectric resonator local oscillator.

8. A multiband radar detector device as claimed in claim 6, wherein each dielectric resonator is positioned a distance that is measured from the centre of the respective dielectric resonator to an end of the feedline, which distance is equal to an odd number of quarter wave lengths of the frequency of each respective dielectric resonator.

9. A multiband radar detector device as claimed in claim 5, where said bias supply means is switchable between a mode to supply direct current bias to said mixer and a mode in which no direct current bias is supplied to said mixer.

10. A multiband radar detector as claimed in claim 5, wherein the number of dielectric resonator local oscillator is chosen to accommodate the expected number of radar frequency bands to be monitored, and the fundamental frequency or twice the fundamental frequency of each dielectric resonator local oscillator is chosen to produce beats with a radar signal in a respective radar frequency band.

* * * * *